Patented June 25, 1946

2,402,858

UNITED STATES PATENT OFFICE 2,402,858

ISOMERIZING HYDROCARBONS

Halsted R. Warrick, West Englewood, N. J., assignor to The Texas Company, New York, N. Y., a corporation of Delaware No Drawing. Application March 18, 1943, Serial No. 479,639

8 Claims. (Cl. 260—683.5)

This invention relates to isomerizing normal paraffins to produce isoparaffins or to improve the branched chain character of saturated feed hydrocarbons.

The invention contemplates effecting isomerization with a liquid isomerization catalyst comprising a metallic halide-hydrocarbon complex and restoring the activity of the complex at intervals by treatment with a hydrocarbon of relatively lower molecular weight than the feed hydrocarbon normally being charged to the process.

In accordance with the invention a feed hydrocarbon such as normal pentane or a mixture of hydrocarbons such as a pentane-hexane fraction of straight-run naphtha is subjected to contact with a metallic halide-hydrocarbon complex catalyst in the presence of hydrogen halide under conditions of temperature such that isomerization constitutes the principal reaction. The isomerization treatment is advantageously carried out in a continuous manner, the flow of feed hydrocarbons in contact with the complex catalyst being continued for a substantial period of time. Thereafter the catalyst is subjected to contact with a stream of lower molecular weight hydrocarbons such as normal butane, the catalyst being maintained at a temperature not greater than the reaction temperature prevailing during treatment of the higher molecular weight feed hydrocarbons, and preferably at a somewhat lower temperature so as to avoid side reactions which would result in objectionable complex formation. The flow of lower molecular weight hydrocarbon through the reaction zone is continued in the presence of hydrogen halide for a period of time sufficient to restore the activity of the complex catalyst. Thereafter the normal operation is resumed.

More specifically it is contemplated continuing the flow of the higher molecular weight feed hydrocarbon through the complex catalyst mass for a period which may range from one to several days or until such time as the activity of the catalyst for isomerizing the feed hydrocarbon has declined substantially. At this time the flow of feed hydrocarbon is temporarily discontinued or may be diverted from the reaction zone to an adjacent reaction zone containing more active or recently activated catalyst. During the discontinuance of such flow normal butane is passed continuously through the offstream reaction zone while maintained at a temperature of about 180 to 210° F. under which conditions isomerization of the normal butane also occurs. During continued flow of normal butane through the reaction zone for a few hours or more the activity of the complex catalyst is increased. The flow of normal butane may be continued for a period which may range from several hours to several days. Thereafter the flow of higher molecular weight feed hydrocarbon is resumed and continued until such time as the catalyst requires reactivation by further treatment with normal butane.

It has been found that an effective catalyst for effecting isomerization of the hydrocarbons consists essentially of aluminum halide-hydrocarbon complex and particularly a complex which is characterized by having a heat of hydrolysis in the range about 200 to 400 calories per gram of complex. Advantageously the complex is substantially free from undissolved solid aluminum halide. For example, the complex is free from solids that would be separated by centrifuging at about 3000 revolutions per minute for a period of 30 minutes in an A. P. I. centrifuge at about normal room temperature.

The complex may be prepared by reacting aluminum halide with a saturated aliphatic hydrocarbon in the presence of hydrogen chloride at a temperature of about 200° F. as will be described in more detail later.

At any rate it has been found that by employing a liquid complex catalyst of the character in question migration of aluminum halide from the reaction zone can apparently be completely avoided so that the effluent hydrocarbon stream from the reaction zone will be free or at least substantially free from aluminum halide. This involves an important advantage over the type of process which employs a solid catalyst, in which type of process a large amount of aluminum halide is carried out of the reaction zone in the effluent hydrocarbon stream.

It has been observed that a complex catalyst of this type when used for isomerizing $C_5$ and higher molecular weight hydrocarbons may lose its activity during continued use, loss of activity being reflected by a progressive decrease in the degree of octane improvement in the converted hydrocarbons. During this continued use a decrease in the specific gravity of the complex, say from about 1.5 or 1.4 to 1.3 is observed, which indicates an increase in the hydrocarbon content of the complex. It is preferred to maintain the gravity of the complex at least about 1.35 relative to water at 60° F.

Restoration of the catalyst activity during the treatment with normal butane may involve alkylation reactions between normal or iso butane and a portion of the hydrocarbon material which has become complexed with the aluminum halide during isomerization of the higher molecular weight feed hydrocarbon. The normal butane treatment may also involve a certain amount of washing or displacement from the catalyst of undesired hydrocarbon residues.

Thus, by way of example, a normal pentane-hexane fraction of straight-run naphtha is charged continuously through a reaction tower containing a substantial body of aluminum halide-hydrocarbon complex liquid maintained at a temperature of about 180 to 210° F. The reaction is carried out in the presence of a small amount of hydrogen chloride. During the first few hours of the run the product is characterized by having a clear C. F. R. M. octane number of about 79.6 as compared with a C. F. R. M. octane number of 60.8 for the feed fraction. After about 50 hours' onstream the octane number of the product decreases to about 77.7. After about 80 hours' onstream the octane number has decreased to about 69.

Upon substituting normal butane for the pentane-hexane fraction and charging normal butane through the thus used complex catalyst while maintained at about 210° F. and in the presence of hydrogen chloride the yield of isobutane initially obtained would be about 27 mol per cent of the normal butane charged. Upon continuing the flow of normal butane through the complex catalyst under these conditions the per cent conversion to isobutane is progressively increased so that after running for about 50 hours under these conditions the yield of isobutane may be about 40 mol per cent, indicating that the activity of the catalyst has been restored substantially.

Upon discontinuing the charging of normal butane and resuming the flow of the pentane-hexane fraction the octane number of the isomerized product issuing from the reactivated catalyst will correspond approximately to the octane number of the isomerized feed initially obtained, namely, in the neighborhood of about 79.

The flow of the pentane-hexane fraction may then be continued for another period ranging from 1 to several days, following which the catalyst is again subjected to reactivating treatment with normal butane as above described over a period ranging from about 1 to 2 days.

The reason for the unexpected increase in activity of the catalyst during the period that normal butane is being charged is not understood. It may be that a small portion of the normal butane reacts with aluminum halide in the catalyst to form a new type of complex which activates the main catalyst body. On the other hand the increase in activity may be at least partly the result of a washing or scrubbing action by which certain heavier hydrocarbon constituents of the complex which form and accumulate during the treatment of the pentane-hexane fraction are selectively removed during the normal butane treatment.

Intermittent treatment of the catalyst with the normal butane under isomerizing conditions is preferred over continuous and simultaneous charging of normal butane and the higher molecular weight feed hydrocarbon since the intermittent type of operation carried out under different temperature conditions is apparently more effective in activating the catalyst.

While mention has been made of isomerizing a pentane-hexane fraction of straight-run naphtha it is, of course, contemplated that the process is applicable to the isomerization of any higher molecular weight saturated hydrocarbon having 5 to 7 or more carbon atoms per molecule at a temperature ranging from about 100 to 250 or 300° F. However, it is of particular advantage in the isomerization of normal paraffins such as pentane and hexane.

The frequency of activation of the complex catalyst and also the length of the period of activation may be varied substantially from those indicated above. For example, the higher molecular weight feed hydrocarbon may be charged continuously for a period of less than 24 hours and then normal butane charged for a relatively short period of 1 or 2 hours.

As previously mentioned the complex may be formed by reacting a metallic halide such as aluminum chloride or aluminum bromide with a saturated hydrocarbon in the presence of hydrogen chloride. In starting up the operation it may be advantageous to employ a preformed complex obtained by reacting aluminum halide with a kerosene or kerosene fraction which is substantially free from olefin and aromatic hydrocarbons. The resulting complex is then charged to the reactor and a small amount of aluminum halide may be added continuously or intermittently to the reaction zone throughout the period of operation, a small and corresponding amount of used complex being withdrawn from the reaction zone. In other words the addition of aluminum halide and the withdrawal of used complex is regulated so that the main body of liquid complex catalyst maintained within the reaction zone will be characterized by having a heat of hydrolysis not in excess of about 400 calories per gram of complex and preferably about 300 to 320.

In preparing the preformed kerosene complex aluminum chloride and kerosene in proportion of about 4¼ pounds of aluminum chloride per gallon of kerosene may be charged into a closed vessel. The temperature of the mixture is raised to about 200° F. and hydrogen chloride vapor is injected until the pressure stabilizes at about 35 pounds per square inch gauge. The contents of the vessel are subjected to mixing and after several hours the pressure rises. Cracked gases are vented from the vessel until the pressure drops to about 25 pounds per square inch gauge and the vessel is again repressured to 35 pounds by the injection of hydrogen chloride. This venting and repressuring may be repeated 2 or 3 times during a period of 8 or 9 hours required for forming and stabilizing complex. The complex phase is separated from any hydrocarbon phase that may be present prior to introduction to the reaction zone of the isomerization process.

In effecting the isomerization reaction the catalyst is promoted by the continual or intermittent addition of hydrogen chloride or other suitable hydrogen halide which may be injected in the entering hydrocarbon stream or may be separately injected to the reaction zone. The amount of hydrogen chloride so injected may amount to about 1 to 5% by weight of the feed hydrocarbon undergoing treatment.

Obviously, many modifications and variations of the invention, as hereinbefore set forth, may be made without departing from the spirit and scope thereof, and therefore only such limitations should be imposed as are indicated in the appended claims.

I claim:
1. A process of isomerizing hydrocarbons by contact with a metallic halide-hydrocarbon com- plex isomerization catalyst which comprises passing a saturated higher molecular weight feed hydrocarbon containing at least 5 carbon atoms per molecule through a reaction zone containing said complex having essentially the isomerizing action of aluminum chloride-hydrocarbon complex with a heat of hydrolysis within the range 200-400 calories per gram of complex and maintained in the presence of hydrogen halide under conditions such that isomerization constitutes the principal reaction, continuing the flow of higher molecular weight feed hydrocarbon through the reaction zone until activity of the complex catalyst diminishes substantially, temporarily discontinuing passage of said high molecular weight feed hydrocarbon through the complex catalyst, during said discontinuance passing a saturated $C_4$ hydrocarbon through said reaction zone while maintained at substantially the reaction temperature effective for isomerization of said $C_4$ hydrocarbon, continuing the flow of said $C_4$ hydrocarbon in the presence of hydrogen halide until activity of the catalyst has increased substantially and thereafter resuming the flow of said higher molecular weight feed hydrocarbon through the reaction zone.

2. The process according to claim 1 in which the higher molecular weight feed hydrocarbon comprises a hydrocarbon selected from the group of hydrocarbons having from about 5 to 7 carbon atoms per molecule.

3. A process for isomerizing hydrocarbons by contact with a metallic halide-hydrocarbon complex isomerization catalyst which comprises passing a saturated feed hydrocarbon of about 5 to 7 carbon atoms per molecule through a reaction zone containing a catalyst consisting essentially of aluminum halide-hydrocarbon complex maintained in the presence of hydrogen halide at a temperature in the range about 150 to 250° F. such that isomerization constitutes the principal reaction, continuing the flow of said feed hydrocarbon through the reaction zone until activity of the catalyst diminishes substantially, temporarily discontinuing passage of said feed hydrocarbon through the reaction zone, during said discontinuance passing normal butane through said reaction zone while maintained at a temperature substantially lower than said reaction temperature but sufficiently high to effect substantial isomerization of normal butane, continuing the flow of normal butane therethrough in the presence of hydrogen halide until activity of the catalyst has increased substantially, thereafter resuming the flow of said feed hydrocarbon through the reaction zone.

4. The process according to claim 3 in which the complex catalyst has a heat of hydrolysis in the range about 200 to 400 calories per gram of complex.

5. The process according to claim 3 in which the complex has a heat of hydrolysis not exceeding about 400 calories per gram of complex and is substantially free from undissolved solid aluminum halide.

6. A process for isomerizing hydrocarbons by contact with a metallic halide-hydrocarbon complex isomerization catalyst which comprises passing higher molecular weight feed hydrocarbons containing at least 5 carbon atoms per molecule through a reaction zone containing a catalyst consisting essentially of aluminum halide-hydrocarbon complex, said complex maintained in the presence of hydrogen halide under conditions such that isomerization constitutes the principal reaction, continuing the flow of higher molecular weight feed hydrocarbon through the reaction zone until activity of the complex catalyst diminishes substantially, temporarily discontinuing passage of said high molecular weight feed hydrocarbon through the complex catalyst, during said discontinuance passing a saturated $C_4$ hydrocarbon through said reaction zone while maintained at substantially the reaction temperature effective for isomerization of said $C_4$ hydrocarbon, continuing the flow of said $C_4$ hydrocarbon in the presence of hydrogen halide until activity of the catalyst has increased substantially and thereafter resuming the flow of said higher molecular weight feed hydrocarbon through the reaction zone.

7. The process method according to claim 6 in which the aluminum halide-hydrocarbon complex has a heat of hydrolysis in the range about 300-320 calories per gram of complex.

8. A process for isomerizing hydrocarbons by contact with a metallic halide-hydrocarbon complex isomerization catalyst which comprises passing a saturated higher molecular weight feed hydrocarbon containing at least 5 carbon atoms per molecule through a reaction zone containing a catalyst consisting essentially of aluminum halide-hydrocarbon complex maintained in the presence of hydrogen halide at a temperature in the range about 150-250° F., such that isomerization constitutes the principal reaction, continuing the flow of said feed hydrocarbon through the reaction zone until activity of the catalyst diminishes substantially, temporarily discontinuing passage of said feed hydrocarbon through the reaction zone, during said discontinuance passing a paraffin of lower molecular weight than said feed hydrocarbon through said reaction zone while maintained at a temperature not greater than the aforesaid reaction temperature but sufficient to effect substantial isomerization of said lower molecular weight paraffin, continuing the flow of said lower molecular weight paraffin therethrough in the presence of hydrogen halide until activity of the catalyst has increased substantially, thereafter resuming the flow of said higher molecular weight feed hydrocarbon through the reaction zone.

HALSTED R. WARRICK.